June 16, 1953   A. W. McKEE   2,641,939
TIP UP EXTENSION FOR AIR BRAKE LEVERS
Filed Nov. 4, 1949

Inventor
Arnold W. McKee
By Robert M. Dunning

Patented June 16, 1953

2,641,939

UNITED STATES PATENT OFFICE 2,641,939

TIP UP EXTENSION FOR AIR BRAKE LEVERS

Arnold W. McKee, Des Moines, Iowa

Application November 4, 1949, Serial No. 125,430

8 Claims. (Cl. 74—484)

1

My invention relates to an improvement in tip up extension for air brake levers of a type particularly useful in conjunction with air brake levers on trucks and truck tractors.

Trucks, trailer trucks, and truck tractors, are often provided with air brakes to insure effective braking of the heavy vehicles. These air brakes are usually operated by an air brake lever mounted on the steering column immediately below the steering wheel. The purpose of mounting the lever closely adjacent the steering wheel is to permit the driver to quickly manipulate the lever when necessary. However, the lever is spaced a substantial distance below the steering wheel and extends only a small part of the distance to the periphery of the steering wheel so that the steering wheel can be readily operated without accidental engagement with the brake operating lever. It has been proposed to lengthen the brake levers so that they will extend near the periphery of the steering wheel. However, in such a location they have been found to interfere with the use of the steering wheel and in manipulating the steering wheel the brake lever is sometimes accidentally moved.

The object of the present invention lies in the provision of an extension for the brake lever which extends outwardly from the steering column to a point substantially even with the periphery of the steering wheel, but spaced substantially below the wheel. This extension is pivotally supported by the brake operating lever so that it may be swung toward the steering wheel when desired. As a result the vehicle operator may hold the extension with his fingers while the hand engages the steering wheel so that the lever may be instantly actuated. At the same time, the extension may be disengaged at any time so that it will fall back into spaced relation with the steering wheel when the vehicle operator is turning the steering wheel.

A feature of the present invention lies in the provision of a brake operating lever extension which includes a member designed to clamp firmly about the brake operating lever and to be supported in fixed relation thereto. An extension arm is hingedly secured to this fixed clamping portion so as to swing toward the steering wheel when it is desired. The extension is so arranged as to normally swing out of proximity with the steering wheel when not in use.

An added feature of the present invention lies in the provision of an extension including a channel shaped element designed to partially enclose the brake operating lever and to form an extension therefor. The channel shape of the extension and the pivotal mounting thereof permit the lever to be swung out of alignment with the brake operating lever when desired. The lever tends to limit pivotal movement of the extension when the extension is not being used.

These and other objects and novel features of

2 my invention will be more clearly and fully set forth in the following specification and claims.

In the drawings forming a part of my specification:

Figure 1:
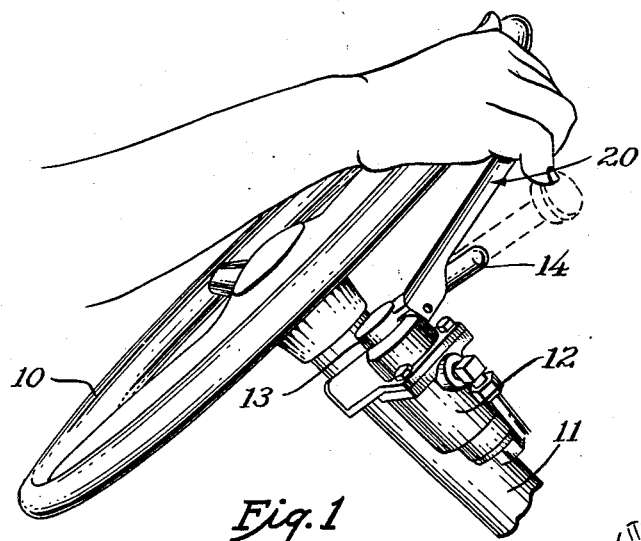
Figure 1 is a perspective view of a vehicle steering wheel and an air brake operating lever secured to the steering wheel column, the view showing the lever extension in operation.

In Figure 1 of the drawings I disclose a vehicle steering wheel 10 which is mounted upon the steering post or steering column 11. An air brake valve 12 of any suitable design is also mounted upon the steering column 11 by any suitable means. The valve 12 is of the rotary type and includes a rotatable head 13 having a lever 14 extending radially therefrom. The valve 12 is operated by oscillation of the lever 14.

In ordinary practice the lever 14 is supported below the level of the vehicle steering wheel 10 and is substantially shorter than the radius of the steering wheel 10 so that the lever can not easily be accidentally moved while turning the steering wheel. The present invention is designed to permit extension of this lever 14 to a point adjacent the periphery of the steering wheel 10 without danger of accidental displacement while operating the steering wheel.

The lever 14 is shown as being generally cylindrical in form and having a rounded end 15. My extension includes a clamping bracket 16 which is provided with an aperture 17 therethrough of a size to accommodate the lever 14. A set screw 19 or similar device is provided for holding the bracket 16 in adjusted position upon the lever 14. The set screw 19 may hold the bracket 16 at the proper location longitudinally of the lever 14 and also may hold the bracket in proper angular relation to the lever.

The extension includes an arm 20 which is shown as comprising sheet material bent or formed into suitable shape. The arm 20 is provided with a tubular outer end 21 which is preferably cylindrical in section. From a point spaced from the outer end 22 of the arm 20, the arm is channel shaped or inverted U-shaped in section, the arm having a pair of substantially parallel sides 23 and 24 connected by a rounded or curved upper extremity 25. The sides 23 and 24 near the inner end of the arm are increased in depth as indicated at 26, the wider sides being designed to straddle the bracket 16. A pivot pin 27 extends through the lower portion of the bracket 16 and through the sides of the arm 20 to pivotally secure the arm to the bracket 16.

Figure 2:
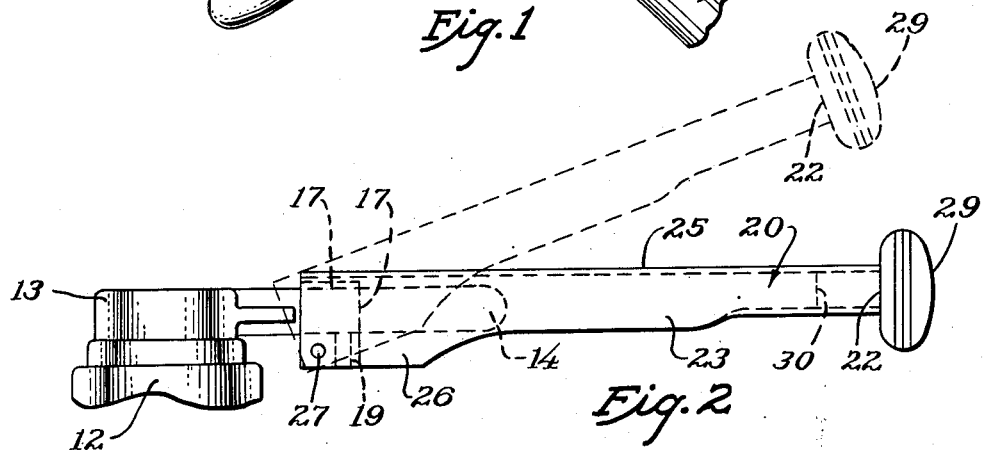
Figure 2 is a side view of the brake operating lever and the extension therefor.
Figure 3:
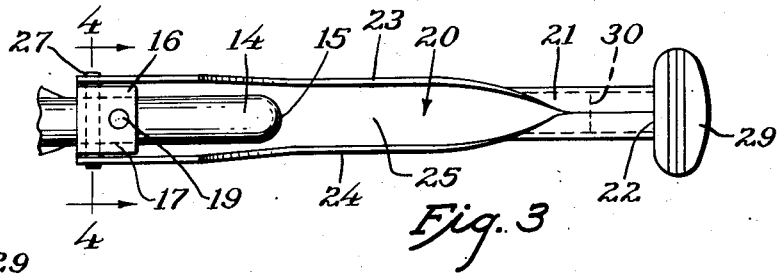
Figure 3 is a bottom plan view of a portion of the brake operating lever and the lever extension.
Figure 4:
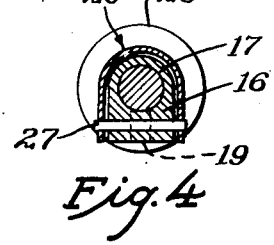
Figure 4 is a sectional view through the operating lever and extension, the position of the section being indicated by the line 4—4 of Figure 3.

As indicated in Figure 2 of the drawings the arm 20 may extend in substantially longer relation to the lever 14 in one position thereof and the lever is arranged so that the weight thereof tends to normally swing the arm 20 into substantially aligned relation to the lever 14. However, as also illustrated in Figure 2 and in Figure 1 of the drawings, the arm 20 may pivot relative to the lever 14 so that the outer end 22 thereof is closely adjacent to the periphery of the steering wheel 10.

A knob 29 is preferably mounted on the outer end of the arm 20, the knob being provided with an integral shank 30 of proper diameter to frictionally engage within the tubular portion 21 of the arm. The knob similarly may be threaded into the end of the arm, may be cemented or attached thereto, or a pin may extend through the arm and through the shank 30 to hold these parts assembled.

The axis of the pivot pin 27 is substantially normal to a radial plane extending through the axis of the valve 12 so that the lever arm 20 may swing toward the periphery of the steering wheel 10. Regardless of the angular position of the lever 14, the weight of the arm 20 and the knob 29 tends to swing the arm into substantial alignment with the lever 14 unless it is actually held in tilted position. The position of the bracket 16 is adjusted so that the knob 29 is in a desired relation to the steering wheel when the brake lever is in "OFF" position.

In conditions of heavy traffic when there is a likelihood that the vehicle must be stopped on short notice, the arm 20 is held in upwardly tilted position as shown in full lines in Figure 1 of the drawings so that it is actually held in the hand. If it becomes necessary to operate the brake lever this may be done while the hand of the operator is sliding over the surface of the steering wheel 10. At the same time, if it becomes necessary to operate the steering wheel upon short notice, the fingers of the right hand may drop the brake extension and grasp the steering wheel firmly to accomplish this result.

In accordance with the patent statutes, I have described the principles of construction and operation of my extension for air brake levers, and while I have endeavored to set forth the best embodiment thereof, I desire to have it understood that obvious changes may be made within the scope of the following claims without departing from the spirit of my invention.

I claim:

1. A brake lever extension for use in conjunction with a brake valve lever mounted on a vehicle steering wheel column, the extension including a clamping sleeve slidably embracing said lever, means for securing the sleeve in place upon the lever, an arm, means pivotally securing said arm to said sleeve, a portion of said arm overlapping said lever, the free end of said arm being pivotal toward and away from the periphery of the steering wheel.

2. A brake lever extension for use in conjunction with brake levers mounted upon vehicle steering wheel columns, the extension comprising an arm having end portions and an intermediate portion, one end portion constituting a channel provided with side walls of sufficient depth to extend below the brake lever, the intermediate portion constituting a channel having side walls of a depth approximating the thickness of the brake lever and the other end portion constituting a tube, said intermediate portion merging into said tube, a sleeve adapted to be slidably mounted on the brake lever, means for retaining said sleeve in a preferred position on the brake lever at a point remote from the free end of said lever, a lateral pin carried by said sleeve, the ends of which pin are received by the side walls of said first end portion to thereby permit pivotal movement of the arm toward and from the steering wheel, the lever serving as a stop to limit pivotal movement of said arm away from the steering wheel.

3. A brake lever extension for use in conjunction with brake levers mounted upon vehicle steering wheel columns, the axes of the brake lever and the steering wheel being substantially parallel, the extension including an arm pivotally secured to the brake lever in overlapping fashion to normally extend in substantial alignment therewith, a pivot connecting said lever and extension, the axis of said pivot extending in a plane normal to the axes of the steering wheel and brake lever, means limiting the pivotal movement of said extension in a direction away from the steering wheel when the extension is substantially aligned with the brake lever, said pivot permitting pivotal movement of the extension to an acute angle to the brake lever toward said steering wheel and so connecting said lever and extension that the brake lever may be pivoted about its axis by said extension when the extension is at said acute angle.

4. The structure of claim 3 and in which the pivot connecting the brake lever and the extension is spaced from the end of the brake lever, and the end of the brake lever beyond the pivot forms the means limiting pivotal movement of the extension.

5. The structure defined in claim 3 and in which an extremity of the extension is pivoted by said pivot to an intermediate point on the brake lever.

6. The structure defined in claim 3 and in which the brake lever includes a channel shaped portion and said pivot extends through an end of said channel shaped extension portion and pivotally connects this extension end to an intermediate point on said brake lever.

7. The structure defined in claim 3 and in which the extension includes a channel shaped end overlying and straddling a portion of the brake lever.

8. The structure defined in claim 3 and including a bracket adjustably connected to the brake lever, and in which said extension includes a channel shaped end straddling said brake lever and bracket, said pivot pivotally connecting said bracket and said extension.

ARNOLD W. McKEE.

References Cited in the file of this patent

UNITED STATES PATENTS

| Number | Name | Date |
|---|---|---|
| 602,621 | Grant | Apr. 19, 1898 |
| 612,044 | Lester | Oct. 11, 1898 |
| 1,038,739 | Fox | Sept. 17, 1912 |
| 1,487,604 | Rideout | Mar. 18, 1924 |
| 1,516,637 | Hoover | Nov. 25, 1924 |
| 1,546,389 | Lane | July 21, 1925 |
| 1,569,063 | Zolla | Jan. 12, 1926 |
| 1,608,948 | Martel | Nov. 30, 1926 |
| 2,112,804 | Bahr | Mar. 29, 1938 |
| 2,319,716 | Bixby | May 18, 1943 |
| 2,447,079 | McKinnie | Aug. 17, 1948 |
| 2,497,907 | Peters | Feb. 21, 1950 |
| 2,523,491 | Auten | Sept. 26, 1951 |